Oct. 10, 1961    L. T. GOLDSMITH    3,004,112
MAGNETIC FILM MARKING

Filed Jan. 27, 1958    2 Sheets-Sheet 1

INVENTOR.
LLOYD T. GOLDSMITH
BY
ATTORNEY.

INVENTOR.
LLOYD T. GOLDSMITH
BY
ATTORNEY.

United States Patent Office 3,004,112
Patented Oct. 10, 1961

3,004,112
MAGNETIC FILM MARKING
Lloyd T. Goldsmith, North Hollywood, Calif., assignor to Warner Bros. Pictures, Inc., Burbank, Calif., a corporation of Delaware
Filed Jan. 27, 1958, Ser. No. 711,398
7 Claims. (Cl. 179—100.2)

This invention relates to the production of sound motion pictures, and particularly to the marking of a sound magnetic film with an audible mark during standstill to correspond with a mark on a concomitant picture film.

It is well known that in the production of motion pictures, the pictures are usually photographed on one film simultaneously with the recording of concomitant sound on a sound film. In the past, films have been marked in many ways, such as by clapsticks whereby scene information is held in front of a camera and simultaneously two boards of the slate are brought together to provide a mark on the sound film. However, this type of marking required that the picture and sound films be up to speed. Other marking systems over-expose a picture frame in the camera while the sound film is marked with a punch hole or a pencil mark. With the advent of magnetic sound film recording, however, various methods of marking the magnetic film at standstill have been employed, most of which require the mark to be made manually in such a way that the film is mutilated to some extent.

The present invention provides a mark in the form of a reproducible, audible frequency signal which is recorded over a short length of the magnetic film and which is applied by the simple actuation of a pushbutton when the film is at standstill. This provides an audible signal at a predetermined position and of a short predetermined duration, so necessary to accurate synchronization. The actuation of the button energizes an audio oscillator, the frequency of which may be in the neighborhood of 230 cycles per second. The actuation of the button not only energizes the oscillator but also moves the film over a distance of approximately 5/32 of an inch during the application of the signal tone. In this manner, it is unnecessary to place a manual mark of any kind on the film which may or may not mutilate it.

This magnetic film marking system is particularly applicable to tight loop magnetic film transport systems, such as disclosed in Pettus Patent No. 2,687,882, of August 31, 1954. In such a system, the magnetic film is threaded in a symmetrical path over a single sprocket, two stabilizing drums and two filter rollers, which are biased by several springs and damped with a dashpot. The invention utilizes this type of transport system by permitting the displacement of the filter rollers in a sufficient amount to move the film past the record head to impress a synchronizing mark on the magnetic film at a predetermined point and on approximately 5/32 of an inch of film as it is moved past the record head.

The principal object of the invention, therefore, is to facilitate the application of a start or synchronizing mark on a magnetic sound film.

Another object of the invention is to provide an improved system for marking a magnetic sound film to be subsequently synchronized with a picture film.

A further object of the invention is to provide an improved start or synchronizing marking system for magnetic sound film which only requires the simple actuation of a pushbutton.

A better understanding of this invention may be had from the following detailed description when read in connection with the accompanying drawings, in which.

Figure 1:
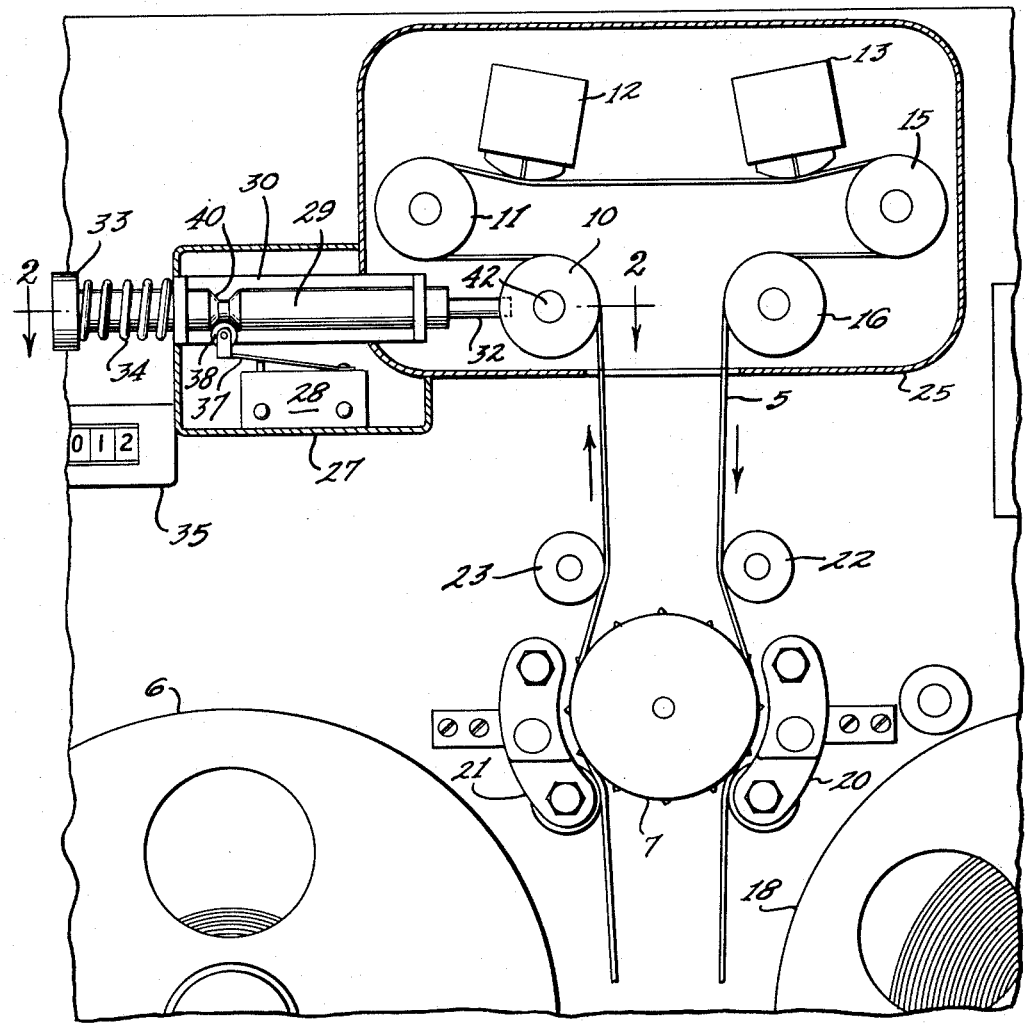
FIG. 1 is an elevational view of a marking system embodying the invention.

Referring, now, to the drawings in which the same reference numerals indicate the same elements, a transport system for a film 5 is from a reel 6 over the left side of a sprocket 7, around a filter roller 10, around a filter stabilizing drum 11, past a recording head 12, past a reproduce monitoring head 13, around a stabilizing drum 15, over a filter roller 16, and down over the right hand side of the sprocket 7 to a takeup reel 18, the film direction being shown by the arrows. The sprocket 7 has the usual pad rollers 20 and 21, two guide rollers 22 and 23 being provided above the sprocket 7. This film transport system is similar to that shown in FIG. 1 of the above-mentioned Pettus patent.

The filter rollers 10 and 16, the stabilizing drums 11 and 15, and the heads 12 and 13 are within a shielding case 25. Mounted at the lower left-hand corner of the shield 25 is a casing 27 in which is a microswitch 28 and a plunger 29 mounted in a casing 30. The plunger 29 extends to the right in the form of a rod 32 and terminates at the left in a button 33. Between the button 33 and the end of casing 30 is a compression spring 34. The usual film footage counter is shown at 35.

Figure 3:
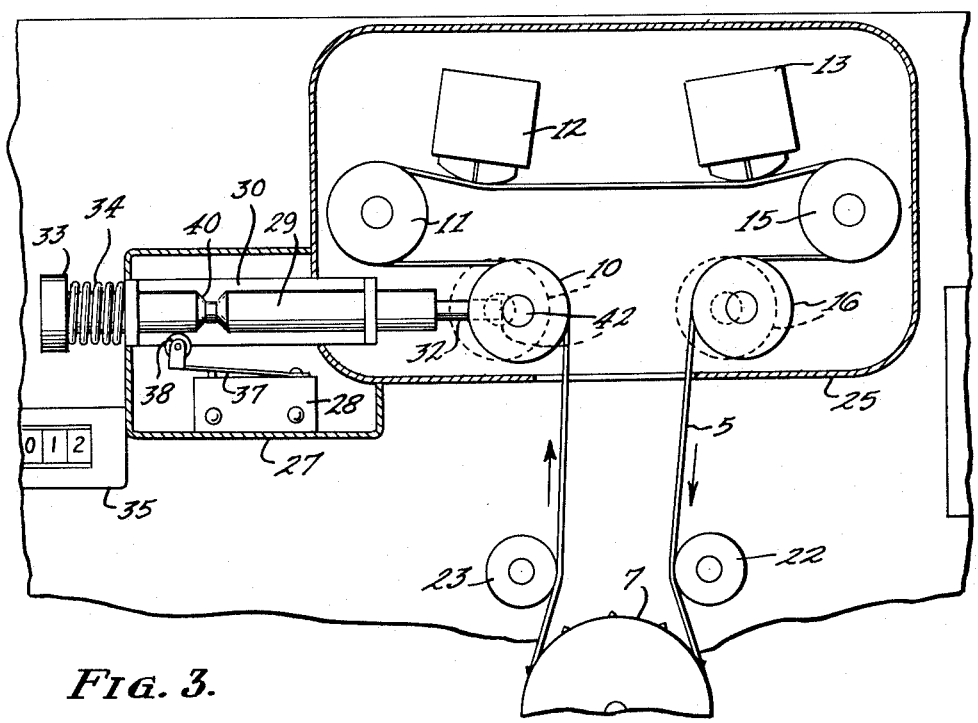
FIG. 3 is an elevational view similar to FIG. 1 in which the pushbutton is shown in an actuated position.

The microswitch 28 has a spring 37 on the end of which is mounted a roller 38 adapted to be positioned in a notch 40 of the plunger 29. When the roller 38 is in the notch 40, the microswitch is open, but when the roller is moved from the notch, as shown in FIG. 3, the microswitch is closed.

Figure 2:
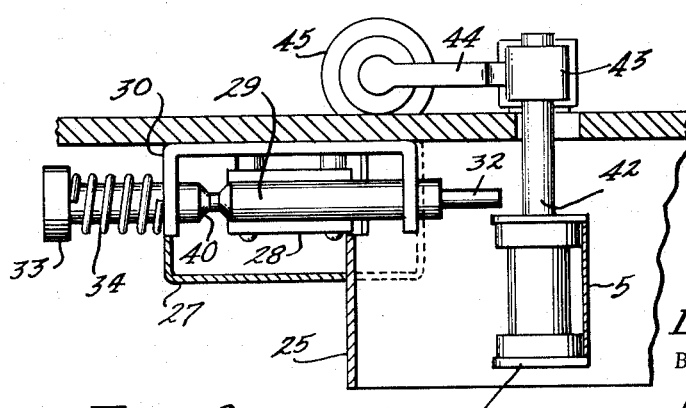
FIG. 2 is a plan view taken along the line 2—2 of the marking system shown in FIG. 1.

As shown in FIG. 2, the roller 10 is mounted on a shaft 42 which extends to a bearing 43, the bearing being mounted on an arm 44 connected to a dashpot 45. As described in the above-mentioned Pettus patent, the arms mounting the rollers 10 and 16 are movable transversely in accordance with the tension in springs interconnecting the arms so that the rollers 10 and 16 may be moved to the right or left and toward and away from one another to provide the desired filtering action for uniform film motion at the heads 12 and 13. Since the film is held stationary by sprocket 7, any movement of the rollers 10 and 16 transversely will move the film past the heads 12 and 13. Thus, if the plunger 29 is pushed to the right, as shown in FIG. 3, the end of rod 32 will abut the shaft 42 of the roller 10 which will move the roller 10 to the right. Since the roller 10 is interconnected with the roller 16 by a spring, and the roller 10 is biased to the right, the roller 16 will also move to the right as shown by the full lines in FIG. 3, the dotted lines of these figures indicating the normal positions of these filter rollers as also shown in FIG. 1.

Figure 4:
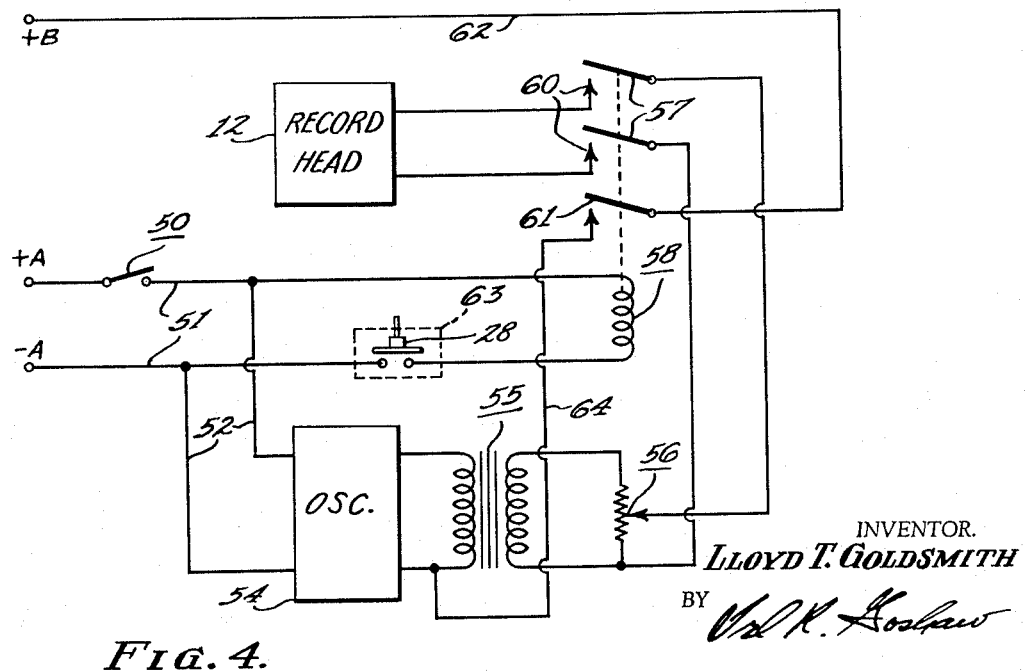
FIG. 4 is a schematic circuit diagram of the control circuit of the invention.

To further describe this marking system, reference is made to FIG. 4 wherein is shown terminals +A and −A to which a source of filament current is connectable. The closing of a switch 50 will connect the filament current source over conductors 51 and 52 to an oscillator 54, the output of which is connected over a transformer 55 and a potentiometer 56 to swingers 57 of a relay 58. Thus, upon the closing of the switch 50, the filaments of the oscillator 54 are energized. The contacts 60 and the relay 58 are connected to the record head 12 so that any output from the oscillator 54 will be impressed upon record head 12 upon the energization of the relay 58. However, the oscillator 54 will not provide any output until plate voltage is applied to the oscillator, this plate voltage being supplied over contacts 61, conductor 62 and conductor 64 from the +B terminal. The microswitch 28 is shown within the dotted lines 63.

To explain the operation of the marking system, upon actuation of the plunger 29 by pressure on the button 33, the roller 38 will be removed from the notch 40 and the microswitch 28 will close its contacts. When the microswitch is closed, the relay 58 will be energized over conductors 51, and the three contacts of the relay will be closed. The closing of the three contacts will connect the transformer 55 to the record head and apply plate voltage to the oscillator tube or tubes. Thus, with the rollers 10 and 16 in their far right position, the record head 12 will receive an audio signal such as 230 cycles per second. Upon release of the button 33, the spring 34 will actuate the plunger 29 to the left which will permit the springs of the rollers 10 and 16 to move the film approximately 5/32 of an inch, during which time the 230 cycle per second tone signal will be applied to the film. When the roller 38 is in the notch 40, the microswitch will open and the signal will be discontinued. Thus, the control tone will be automatically applied during the return of the filter rollers to their normal position moving the film across the record head. Thus, when the sound recordist desires to mark his film, all he does is push the button 33 to the right and release it.

I claim:

1. A film marking system for a magnetic film adapted to be transported in a tight loop with resiliently mounted filter rollers comprising a sprocket adapted to advance film thereon, means for moving said filter rollers a predetermined distance during standstill of said film on said sprocket, a recording head positioned to contact said film, said film being movable past said head upon movement of said rollers and while said recording head is in contact with said film, a source of audio signal, a switch actuated by the movement of said filter roller moving means, means for applying signals from said source to said recording head while said recording head is in contact with said film, and means including said switch for connecting said source of audio signal to said head during the movement of said film past said head, said film remaining at standstill on said sprocket.

2. A magnetic film marking system in accordance with claim 1 in which said means for moving said filter rollers is a plunger, and said signal source is an oscillator, means including said switch being provided for energizing said oscillator upon movement of said plunger.

3. A marking system for a magnetic film adapted to be held in a tight loop around a sprocket, filter rollers, and stabilizing drums comprising a sprocket for advancing all of said film at certain times and holding the portion of said film on said sprocket stationary at other times, a recording head for contacting film, a plunger for moving said filter rollers a predetermined distance to move a portion of said film past said recording head when said film is held stationary on said sprocket, a switch actuated by the movement of said plunger, a source of tone signal, and means for energizing said recording head with said tone signal upon actuation of said plunger, said tone signal being applied to said film during the movement of said rollers to normal operating position, said switch controlling the energization of said source of tone signal and the connection thereof to said head.

4. A system for placing an audio tone signal on a magnetic film over a predetermined length of said film, said system comprising a transport mechanism for said film, said mechanism including a film-engaging sprocket adapted to hold a portion of said film thereon stationary during the placing of said tone signal on another portion of said film, movable means for resiliently supporting said other portion of said film on which said tone signal is to be placed, a recording head positioned to contact said film on said last-named portion thereof, actuating means for moving said film supporting means a predetermined distance, the movement of said supporting means causing said other film portion on which said tone signal is to be placed to move correspondingly a predetermined distance past said head while said head is in contact with said other film portion, means responsive to said actuating means for developing an audio tone signal, and means for applying said audio tone signal to said moving film portion during movement thereof past said head and while the film portion on said sprocket is held stationary, said last-mentioned means including a switch actuable by said actuating means to control the generation of said audio tone signal.

5. A system in accordance with claim 4 in which said transport mechanism includes fixed stabilizing drums and movable filter rollers.

6. A system in accordance with claim 5 in which said actuating means for moving said filter rollers is a spring biased plunger.

7. A system in accordance with claim 6 in which said means for applying an audio tone signal to said film includes an oscillator connectable to said head and a relay under control of said switch.

References Cited in the file of this patent

UNITED STATES PATENTS

| | | |
|---|---|---|
| 1,479,888 | Boswell | Jan. 8, 1924 |
| 2,558,853 | Kappeler | July 3, 1951 |
| 2,587,593 | Camras | Mar. 4, 1952 |
| 2,646,989 | Davis | July 28, 1953 |
| 2,687,882 | Pettus | Aug. 31, 1954 |
| 2,702,315 | Roderick | Feb. 15, 1955 |
| 2,712,572 | Roberts | July 5, 1955 |